(No Model.)
W. N. HARING.
CAR TRUCK.
No. 487,923.  Patented Dec. 13, 1892.
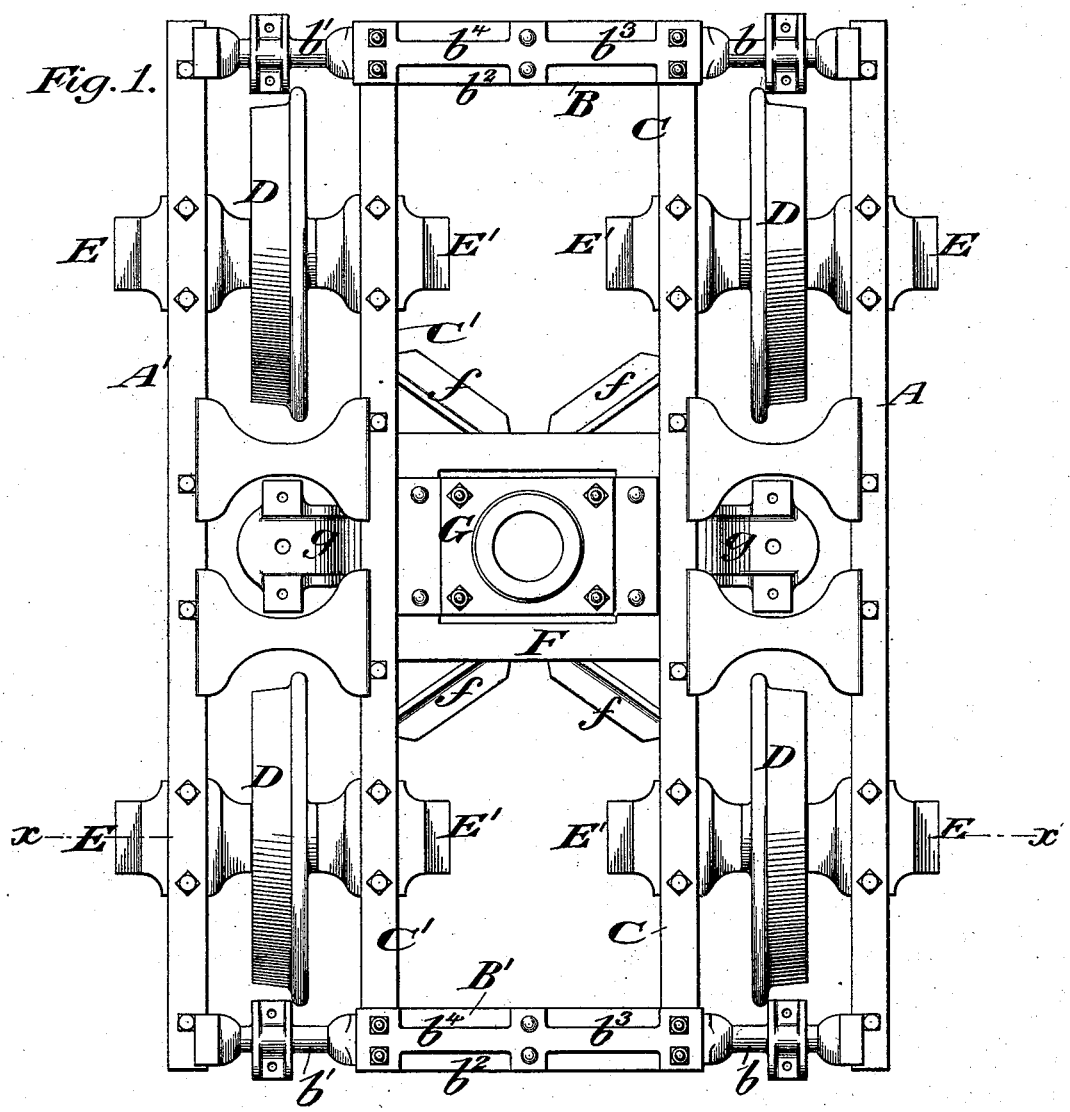
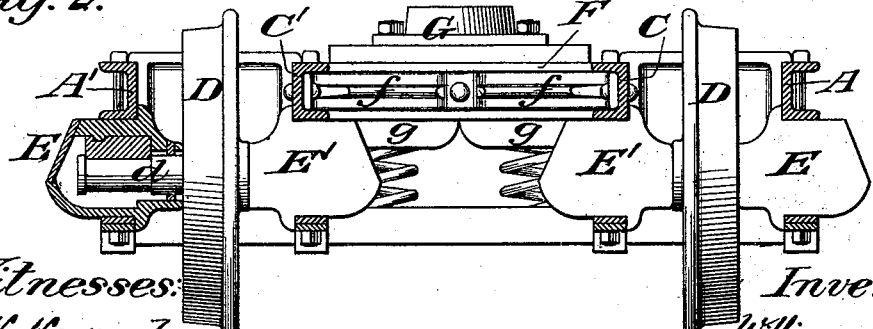

UNITED STATES PATENT OFFICE.

WILLIAM N. HARING, OF NYACK, ASSIGNOR OF ONE-HALF TO FRANCES J. HASBROUCK, OF NEW YORK, N. Y.

CAR-TRUCK.

SPECIFICATION forming part of Letters Patent No. 487,923, dated December 13, 1892.

Application filed March 15, 1892. Serial No. 425,035. (No model.)

*To all whom it may concern:*

Be it known that I, WILLIAM N. HARING, of Nyack, in the county of Rockland and State of New York, have invented a new and useful Improvement in Car-Trucks, of which the following is a specification.

My invention relates to an improvement in trucks for railway-cars in which the wheels of the truck are permitted independent rotary movements.

A practical embodiment of my invention is represented in the accompanying drawings, in which—

Figure 1 is a top plan view of the truck, and Fig. 2 is a vertical transverse section on the line $x\,x$ of Fig. 1.

The exterior frame of the truck consists of side bars A and A', connected at their ends by cross-beams or girders B B'. The interior frame of the truck is formed by a pair of stringers C C', extending from the cross-beams or girders B B' parallel with the side frames A and A' and spaced therefrom a distance sufficient to receive the car-wheels D between them.

The truck which I have herein illustrated is provided with four wheels, and there are four pairs of boxes E E', one pair for each of the four wheels. The boxes E are rigidly secured to the side frames A and the boxes E' are rigidly secured to the stringers C C', so that the journals $d$ of the axles of the wheels may be received therein. The journals $d$ are preferably fixed to rotate with the wheels, the same as in the ordinary structure of car-wheels, where two wheels are fixed to the same axle.

At the central portion of the truck there is formed a framework F for the reception of the bolster G, on which the weight of the car is supposed to rest. Diagonal braces $f$ extend between the framework F and the stringers C and C' for increasing the rigidity of the truck-frame. The bolster G rests upon a yoke $g$, supported upon heavy springs, which rest upon a cross-beam, as is usual.

The side frames A and A' and the stringers C and C' are preferably formed of channel-iron set on edge, as shown, and the end girders or cross-beams B and B' are formed in three pieces, those portions $b$ and $b'$ between the side frames and stringers being provided with cylindrical central portions and enlarged heads to bear against and space apart the side frames and stringers, while the central portion $b^2$ is T-iron set with its web downward, and slanting braces $b^3$ and $b^4$ extend from its central portion to the upper edges of the stringers C and C'. By this construction and arrangement of parts I am enabled to secure a comparatively light and firm structure in which each of the several wheels has a rotary movement independent of any of the others, so that there will be no slipping required in rounding curves; also, the weight of the car and its load being distributed upon eight bearings instead of upon the ordinary four bearings, the friction and wear will be materially lessened and the danger from hot boxes avoided.

What I claim is—

1. The truck comprising the side frames and stringers formed of angle-bars, T-irons secured to the bottoms of the stringers at their ends, slanting braces extending upwardly and outwardly from the central portions of the T-irons and secured to the tops of the stringers, spacing-bars or girders between the ends of the stringers and side frames, the central frame, diagonal braces connecting the central frame and the stringers, and the wheels journaled in the truck independently of one another, substantially as set forth.

2. The truck comprising the side frame and stringers formed of angle-bars, T-irons connecting the stringers at the ends, the short girders and spacing-bars connecting the ends of the side walls and stringers, the central frame, diagonal braces connecting the central frame and stringers, and the wheels journaled in the frame independently of one another, substantially at set forth.

WILLIAM N. HARING.

Witnesses:
FREDK. HAYNES,
GEORGE BARRY.